United States Patent
Kim et al.

(10) Patent No.: US 7,255,284 B2
(45) Date of Patent: Aug. 14, 2007

(54) SMART CARD AND METHOD FOR CONTROLLING A MIXED MODE THEREOF

(75) Inventors: Ki-Yeol Kim, Gunpo-si (KR); Chan-Yong Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/329,125

(22) Filed: Jan. 11, 2006

(65) Prior Publication Data

US 2006/0186211 A1 Aug. 24, 2006

(30) Foreign Application Priority Data

Feb. 24, 2005 (KR) ...................... 10-2005-0015493

(51) Int. Cl.
*G06K 19/06* (2006.01)
(52) U.S. Cl. .................................... 235/492
(58) Field of Classification Search ............... 235/487, 235/492, 439, 451
See application file for complete search history.

(56) References Cited

U.S. PATENT DOCUMENTS

| | | | |
|---|---|---|---|
| 6,168,083 B1 * | 1/2001 | Berger et al. ............... | 235/492 |
| 6,375,082 B1 * | 4/2002 | Kobayashi et al. .......... | 235/492 |
| 6,944,246 B1 * | 9/2005 | Senba ......................... | 375/354 |
| 6,955,300 B1 * | 10/2005 | Yoshigi et al. .............. | 235/492 |

FOREIGN PATENT DOCUMENTS

| | | |
|---|---|---|
| JP | 2002-279378 | 9/2002 |
| JP | 2003-223618 | 8/2003 |
| KR | 1999-0078167 | 10/1999 |
| KR | 10-2002-0084043 | 4/2002 |

\* cited by examiner

*Primary Examiner*—Thien M. Le
*Assistant Examiner*—April A. Taylor
(74) *Attorney, Agent, or Firm*—Volentine & Whitt, PLLC

(57) ABSTRACT

A mixed mode smart card is disclosed including an internal circuit having a CPU, a contactless mode processor adapted to prosecute a contactless mode operation, and a contact mode processor adapted to prosecute a contact mode operation. The mixed mode smart card also includes a power voltage control block receiving contact and contactless mode power source voltages and supplying the internal circuit with an internal power source voltage derived either during an entire period of mixed mode operation.

20 Claims, 4 Drawing Sheets

SMART CARD AND METHOD FOR CONTROLLING A MIXED MODE THEREOF

BACKGROUND OF THE INVENTION

1. Field of the Invention

Embodiments of the invention relate to smart cards. More particularly, embodiments of the invention relate to smart cards adapted to operate a mixed mode including both contact and contactless modes.

This patent application claims priority to Korean Patent Application 2005-15493 filed Feb. 24, 2005, the subject matter of which is hereby incorporated by reference in its entirety.

2. Discussion of Related Art

The term "smart card" generally refers to a well known class of portable tokens, variously embodied but characteristically comprising at least one integrated circuit (IC) (e.g., a "smart card chip"). Smart cards may be classified in relation to their mode of operation, including generally a contact mode, a contactless mode card, and a mixed mode.

Contact mode smart cards are commonly configured with a so-called subscriber identification module (SIM) and are adapted to operate using power voltages (e.g., source and ground), clock signal(s), a reset signal, and/or data signals electrically provided through connection pins (e.g., contact terminals) included in the smart cards' form factor. For example, a related host device may provide the foregoing signals once the smart card is input to the terminal.

In contrast, contactless mode smart cards are adapted to operate by "abstracting" the power voltages, clock signal(s), reset signal, and data signals from radio frequency (RF) signals received in the smart card through an integrated antenna.

Not surprisingly, mixed mode smart cards are adapted to operate in either contact or contactless modes. Thus, mixed mode smart cards typically include contact pins adapted to engage an external terminal during operation in a contact mode, and an antenna adapted to receive externally provided RF signals during operation in a contactless mode.

FIG. 1 is a block diagram of a conventional smart card system 100 operable in mixed mode. Referring to FIG. 1, smart card system 100 comprises a smart card chip 110, contact terminals 120 to supply voltages, signals, and data to smart card chip 110 in the contact mode, and contactless terminals 130 and 140 to supply voltages, signals, and data to smart card chip 110 in the contactless mode.

In contact mode, smart card system 100 communicates with a host device while being supplied of power voltages, clock signal(s), reset signal, and data signals through contact terminals 120. On the other hand, in contactless mode, smart card system 100 communicates with a host device, by abstracting power voltages, clock signal(s), reset signal, and data signals from RF signals received through contactless terminals 130 and 140.

However, the conventional smart card system as shown in FIG. 1 has a problem related to re-initializing its internal circuits. The problem may occur, for example, when a first ongoing smart operation (either contact or contactless) is interrupted by a second smart card operation made using the alternate mode of operation. For example, the re-initializing problem may occur when during a contact mode of operation (e.g., attempting to pay a bus or subway fare) is interrupted by a contactless mode of operation (receiving an incoming mobile phone call).

SUMMARY OF THE INVENTION

Embodiments of the invention provide mixed mode smart cards having stable operating characteristics, without problems associated with re-initialization of internal circuits, or operating mode switches. Embodiments of the invention are also directed to a related method of controlling operation of a mixed mode smart card in both contact and contactless modes of operation, whereby re-initialization problems do not occur.

Thus, in one embodiment, the invention provides a mixed mode smart card comprising; an internal circuit, a contact mode interface adapted to supply a first power source voltage received through a power source terminal, a contactless mode interface adapted to supply a second power source voltage through an antenna, and a power voltage control block adapted to supply an internal power source voltage to the internal circuit derived from a first applied voltage between the first and second power source voltages.

In another embodiment, the invention provides a method for controlling a smart card adapted for use in mixed modes, the method comprising; receiving in the alternative a contact mode power source voltage or a contactless mode power source voltage as a first applied voltage, upon receiving the contact mode power source as the first applied voltage, prosecuting a contactless mode operation during a contact mode of operation while maintaining the contact mode power source as the power source for the smart card, and upon receiving the contactless mode power source as the first applied voltage, prosecuting a contact mode operation during a contactless mode of operation while maintaining the contactless mode power source as the power source for the smart card.

In yet another embodiment, the invention provides a mixed mode smart card comprising; an internal circuit comprising a central processing unit, a contactless mode processor adapted to prosecute a contactless mode operation, and a contact mode processor adapted to prosecute a contact mode operation, and a power voltage control block adapted to receive a contact mode power source voltage and a contactless mode power source voltage, and further adapted to supply the internal circuit with an internal power source voltage derived from a first applied one of the contact mode power source voltage and the contactless mode power source voltage during an entire period of mixed mode operation characterized by either a contactless mode operation initiated during a contact mode operation following receipt of the contact mode power source voltage as the first applied one, or a contact mode operation initiated during a contactless mode operation following receipt of the contactless mode power source voltage as the first applied one.

BRIEF DESCRIPTION OF THE DRAWINGS

Several embodiments of the invention will be described with reference to the accompanying drawings. Like numerals refer to like elements throughout the specification and drawings. In the drawings.

DESCRIPTION OF EXEMPLARY EMBODIMENTS

Several embodiments of the invention will be described below in some additional detail with reference to the accompanying drawings. The invention may, however, be embodied in different forms and should not be constructed as being limited to only the described embodiments. Rather, these embodiments are provided as teaching examples.

Figure 1:
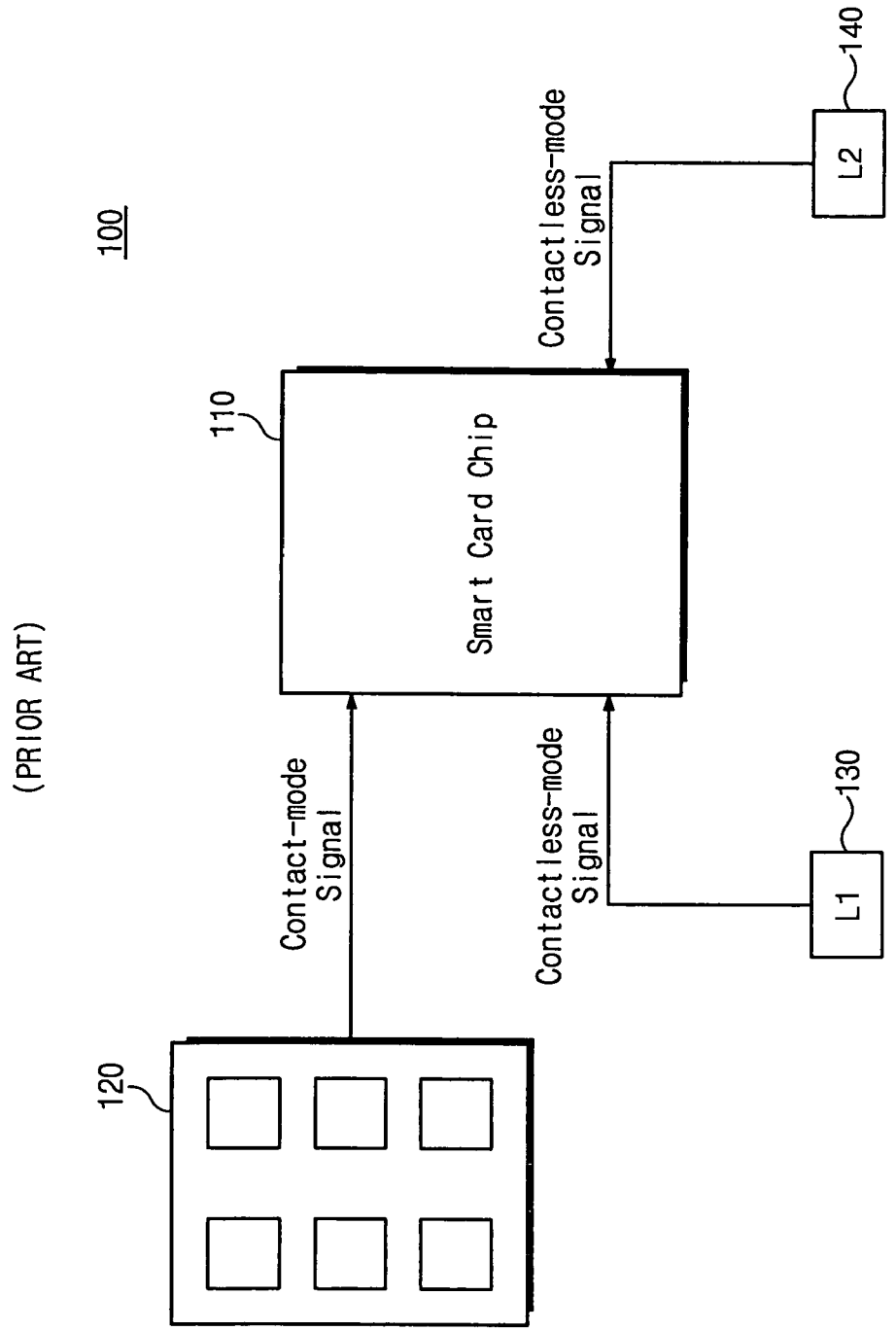
FIG. 1 is a block diagram of a conventional smart card.
Figure 2:
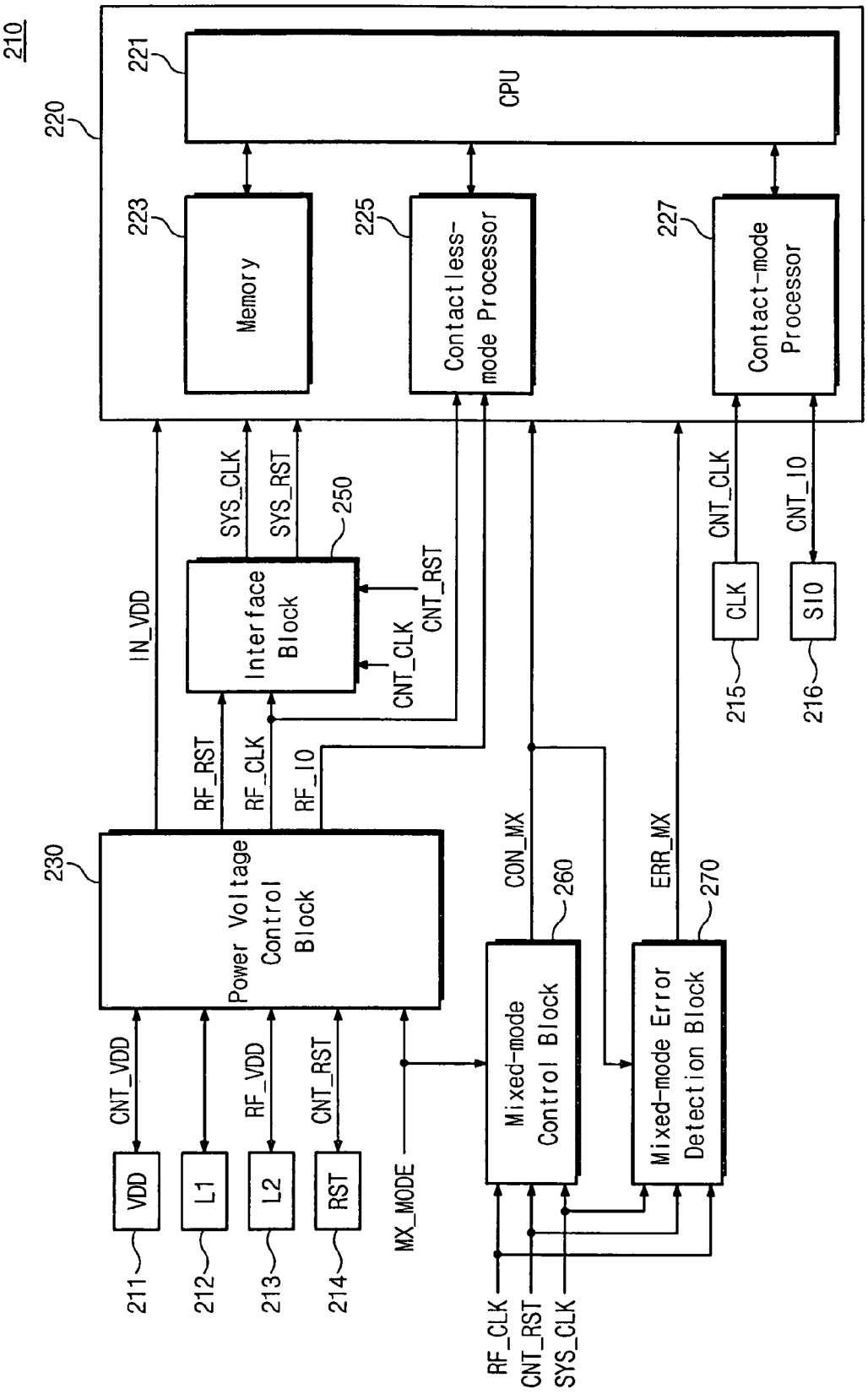
FIG. 2 is a block diagram illustrating a smart card implemented according to one embodiment of the invention.

FIG. 2 is a block diagram illustrating a mixed mode smart card 210 implemented in accordance with one embodiment of the invention. Smart card 210 comprises contact mode interface terminals 211, 214, 215, and 216, contactless mode interface terminals 212 and 213, an internal circuit 220, a power voltage control block 230, a mixed mode control block 260, and a mixed mode error detection block 270.

Contact mode interface terminals, 211, 214, 215, and 216, are provided to conduct various signals to mixed mode smart card 210 during a contact mode of operation using, for example, the interface and communications protocol set forth in International Standard Organization (ISO) standard 7816. Thus, the exemplary contact mode interface terminals comprise a power source terminal 211 through which a contact mode power source voltage (CNT_VDD) is supplied, a reset terminal 214 through which a contact mode reset signal (CNT_RST) is supplied, a clock terminal 215 through which a contact mode clock signal (CNT_CLK) is supplied, and a data terminal 216 through which contact mode input/output data (CNT_IO) is supplied.

The contactless mode interface terminals, 212 and 213, are provided to enable a contactless mode operation for internal circuit 220, using, for example, the interface and communications protocol set forth in ISO standard 14443. The contactless mode of operation is generally provided by abstracting a contactless mode power source voltage (RF_VDD) from an RF signal received via at least one antenna associated with contactless mode interface terminals 212 and 213.

Power voltage control block 230 generates an internal power source voltage (IN_VDD) from a first applied one of contact mode power source voltage (CNT_VDD) or contactless mode power source voltage (RF_VDD). Internal power source voltage (IN_VDD) is then applied to internal circuit 220. In this regard, power voltage control block 230 may be further adapted to abstract a contactless mode clock (RF_CLK), a contactless mode reset signal (RF_RST), and contactless mode data (RF_IO) from the received contactless mode power source voltage (RF_VDD).

In one embodiment, internal circuit 220 comprises a central processing unit (CPU) 221, a memory 223, a contactless mode processor 225, and a contact mode processor 227. Contact mode processor 227 prosecutes the contact-mode operation using the contact mode clock (CNT_CLK) and contact-mode data (CNT_IO). The term "prosecute" as used in this context generally means any execution or advancement of hardware, software, and/or hardware/software based operations within mixed mode smart card 210 to provide some desired functionality. In similar vein, contactless mode processor 225 prosecutes the contactless mode of operation using contactless-mode clock (RF_CLK) and contactless mode data (RF_IO).

Interface block 250 generates a system clock (SYS_CLK) and a system reset signal (SYS_RST) in relation to the contact-mode clock (CNT_CLK) and contact-mode reset signal (CNT_RST) when the first applied voltage is the contact mode power source voltage (CNT_VDD). Otherwise, when the first applied voltage is the contactless mode power source voltage (RF_VDD), interface block 250 generates the system clock (SYS_CLK) and the system reset signal (SYS_RST) using the contactless mode clock (RF_CLK) and contactless mode reset signal (RF_RST). Thus, the system clock and the system reset signals are generated from signals associated with the first applied power source voltage. Internal circuit 220 receives and operates in accordance with the system clock (SYS_CLK) and system reset signal (SYS_RST).

Mixed-mode control block 260 regulates the mode of operation for mixed mode smart card 210 and transitions (i.e., conversions) between modes of operation, (i.e., contactless mode operation during an ongoing contact mode of operation, or a contact mode operation during an ongoing contactless mode of operation, wherein an ongoing mode of operation is determined by the first applied voltage).

In one embodiment, mixed-mode control block 260 is adapted to provide a first mode conversion signal (CON_MX) to internal circuit 220, (e.g., a signal indicating a condition wherein a contactless mode clock (RF_CLK) is received following receipt of a first applied voltage comprising the contact mode power source voltage (CNT_VDD)). The first mode conversion signal may be variously configured as a logic signal, for example, indicating a mode conversion for mixed mode smart card 210 from contact to contactless operation. In response to first mode conversion signal (CON_MX), CPU 221 instructs contactless mode processor 225 to begin operation. Thus, when the contactless-mode data (RF_IO) is subsequently received, contactless-mode processor 225 is ready and able to process it.

Mixed-mode control block 260 is further adapted to provide a second mode-conversion signal (CON_MX) to internal circuit 220, (e.g., a signal indicating a condition wherein contact mode clock (CNT_CLK) is received following receipt of a first applied voltage comprising the contactless mode power source voltage (RF_VDD)). The second mode conversion signal may be variously configured as a logic signal, for example, indicating a mode conversion for mixed mode smart card 210 from contactless to contact operation. In response to second mode conversion signal (CON_MX), CPU 221 instructs contact mode processor 227 to begin operation. Thus, when the contact mode data (CNT_IO) is subsequently received, contact mode processor 227 is ready and able to process it.

In the foregoing example, a single signal line is used to indicate both first and second conversion signals using different logic levels. However, this signal might be other embodied.

The conventional mixed mode smart card initializes an internal circuit using a newly applied power source voltage when a mode conversion takes place. That is, if we assume an analogous conventional hardware configuration to that described above, and if we further assume that a contactless mode operation occurs during an ongoing contact mode of operation, the internal circuit of the conventional mixed mode smart card will have been initialized using an internal power source voltage derived from a contact mode power source voltage. But upon receiving an indication of the contactless mode operation, the mixed mode conventional smart card attempts to switch between power source voltages, (i.e., switch to an internal power source voltage derived from the contactless mode power source voltage). This power source switching is a primary cause for the difficulties previously described relative to the operation of conventional mixed mode smart cards. Indeed, there are many problems associated with the simultaneous prosecution of contact and contactless modes of operation, such as interruption of the ongoing operation.

In contrast, power voltage control block 230 provided in the illustrated embodiment maintains a stable internal power source voltage (IN_VDD), as derived from an initial power source voltage (i.e., the first applied power source voltage), even during an operating mode conversion. Therefore, there is no need to re-initialize internal circuit 220, because the internal power source voltage (IN_VDD) supplied to internal circuit 220 by power voltage control block 230 is continuously maintained without a change over caused by a conversion between operation modes.

This functional feature not only allows proper execution of the interrupting operation mode, but also allows the ongoing operation to continue following interruption, thereby assuring that both contact and contactless modes of operation are faithfully and stably prosecuted in a mixed mode smart card system.

Figure 3:
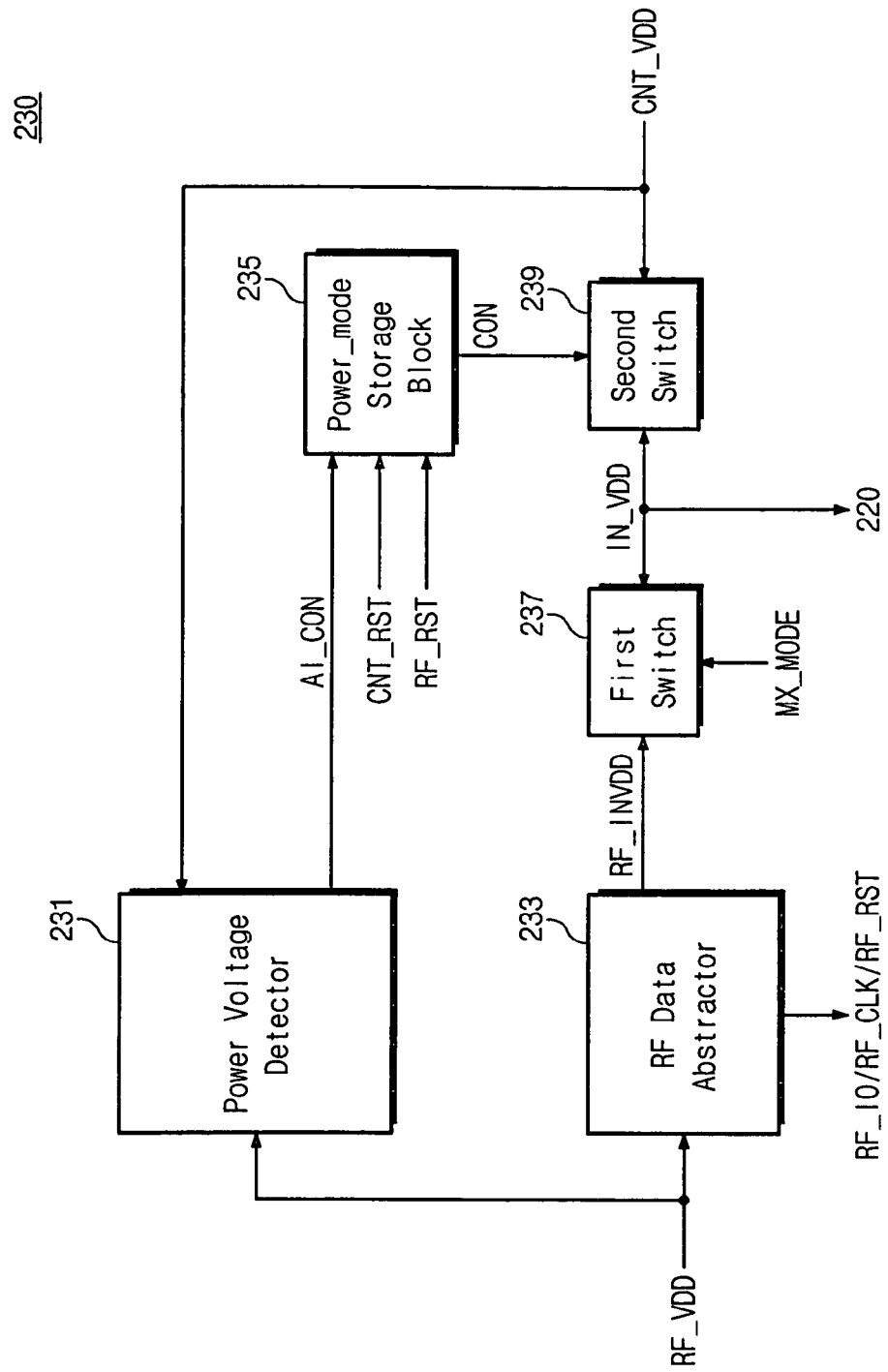
FIG. 3 is a block diagram illustrating a power voltage control block for the exemplary smart card shown in FIG. 2.

FIG. 3 is a block diagram further illustrating the power voltage control block 230 of smart card 210 shown in FIG. 2. Referring to FIG. 3, power voltage control block 230 comprises a power voltage detector 231, an RF data abstractor 233, a power-mode storage block 235, a first switch 237, and a second switch 239.

Referring now collectively to FIGS. 2 and 3, when the contact mode power source voltage (CNT_VDD) is applied through contact mode interface terminal 211, or when the contactless mode power source voltage (RF_VDD) is applied through contactless mode interface terminals 212 and 213, power voltage detector 231 of power voltage control block 230 detects such as a first applied voltage, and generate a power signal (AI_CON). In response to also receiving a reset signal (either CNT_RST or RF_RST), power-mode storage block 235 stores the received power signal (AI_CON) as a first power signal (CON). First power signal (CON) maintains its level without change even when another power source voltage is detected by mixed mode smart card 210.

RF data abstractor 233 derives a contactless mode internal power voltage (RF_INVDD), which is optimized for use by internal circuit 220, from a received contactless mode power source voltage (RF_VDD) using contactless mode clock (RF_CLK), contactless mode reset signal (RF_RST), contactless mode data (RF_IO), and an associated voltage regulator (not shown).

First switch 237 regulates the connection of contactless-mode internal power voltage (RF_INVDD) to internal circuit 220 in response to a mixed mode entering signal (MX_MODE). Second switch 239 regulates the connection of contact mode power source voltage (CNT_VDD) to internal circuit 220 in response to first power signal (CON).

Where mixed mode smart card 210 detects (e.g., upon receipt in internal circuit 220 of the first mode-conversion signal), during a contact mode operation (i.e., a period during which the contact mode power source voltage (CNT_VDD) is powering the smart card), CPU 221 instructs the contactless mode processor 225 to operate such that the contact and contactless modes of operation are simultaneously enabled for at least some period of time. The contactless mode power source voltage (RF_VDD) is regarded as being received in the illustrated example when the contactless mode clock (RF_CLK) is generated for a predetermined minimum number of cycles (e.g., 10 clock cycles).

When this occurs, the mixed-mode entering signal (MX_MODE) transitions from logical high to low and the first power signal (CON) transitions to high. Thus, with these exemplary logic level assumptions in place, first switch 237 turns OFF (e.g., opens) and second switch 239 turns ON (e.g., closes). Thus, internal circuit 220 will be supplied with the internal power source voltage (IN_VDD) derived from the "first applied" contact mode power source voltage (CNT_VDD), so long as connected, even when the contactless mode power source voltage (RF_VDD) is also applied.

Further, under analogous conditions but where the contactless mode power source voltage (RF_VDD) is the "first applied", mixed mode control block 260 generates and applies the second mode conversion signal to internal circuit 220. Then, CPU 221 similarly instructs the contact mode processor 227 to operate in response to the second mode-conversion signal. Accordingly, the "interrupting" contact mode data (CNT_IO) subsequently received in mixed mode smart card 210 may be processed by contact mode processor 227.

That is, if the contact mode power source voltage (CNT_VDD) is detected by mixed mode smart card 210 during a contactless mode operation (i.e., a period during which the contactless mode power source voltage (RF_VDD) is powering the smart card), CPU 221 instructs the contact mode processor 227 to operate such that the contact and contactless modes of operation are simultaneously enabled for at least some period of time. The contact mode power source voltage (CNT_VDD) is regarded as being received in the illustrated example when the contact mode clock (CNT_CLK) is generated for a predetermined minimum number of cycles (e.g., 10 clock cycles).

When this occurs, the mixed-mode entering signal (MX_MODE) transitions from logical low to high and the first power signal (CON) transitions to low. Thus, with these exemplary logic level assumptions in place, first switch 237 turns ON, and second switch 239 turns OFF. Thus, internal circuit 220 will be supplied with the internal power source voltage (IN_VDD) derived from the "first applied" contactless mode power source voltage (RF_VDD), so long as connected, even when the contact mode power source voltage (CNT_VDD) is also applied.

Accordingly, a mixed mode smart card according to one embodiment of the invention is able to retain the internal power source voltage (IN_VDD) even when an interrupting power source voltage associated with another operation mode is applied. There is no need of re-initializing the internal circuit 220, and mixed mode operation is cooperatively maintained in a highly stable manner.

Returning to FIG. 2, the exemplary mixed mode smart card further comprises mixed-mode error detection block 270.

Mixed-mode error detection block 270 may apply a mixed mode error signal (ERR_MX) to internal circuit 220 in response to the contactless mode clock (RF_CLK), the contact mode reset signal (CNT_RST), the system clock (SYS_CLK), and the mode conversion signal (CON_MX). CPU 221 interrupts contact mode processor 227 or contactless mode processor 225 in response to the mixed-mode error signal (ERR_MX). This interrupt signal prevents either of the contact or contactless mode processors from being placed in an infinite loop due to some abnormal operation.

Figure 4:
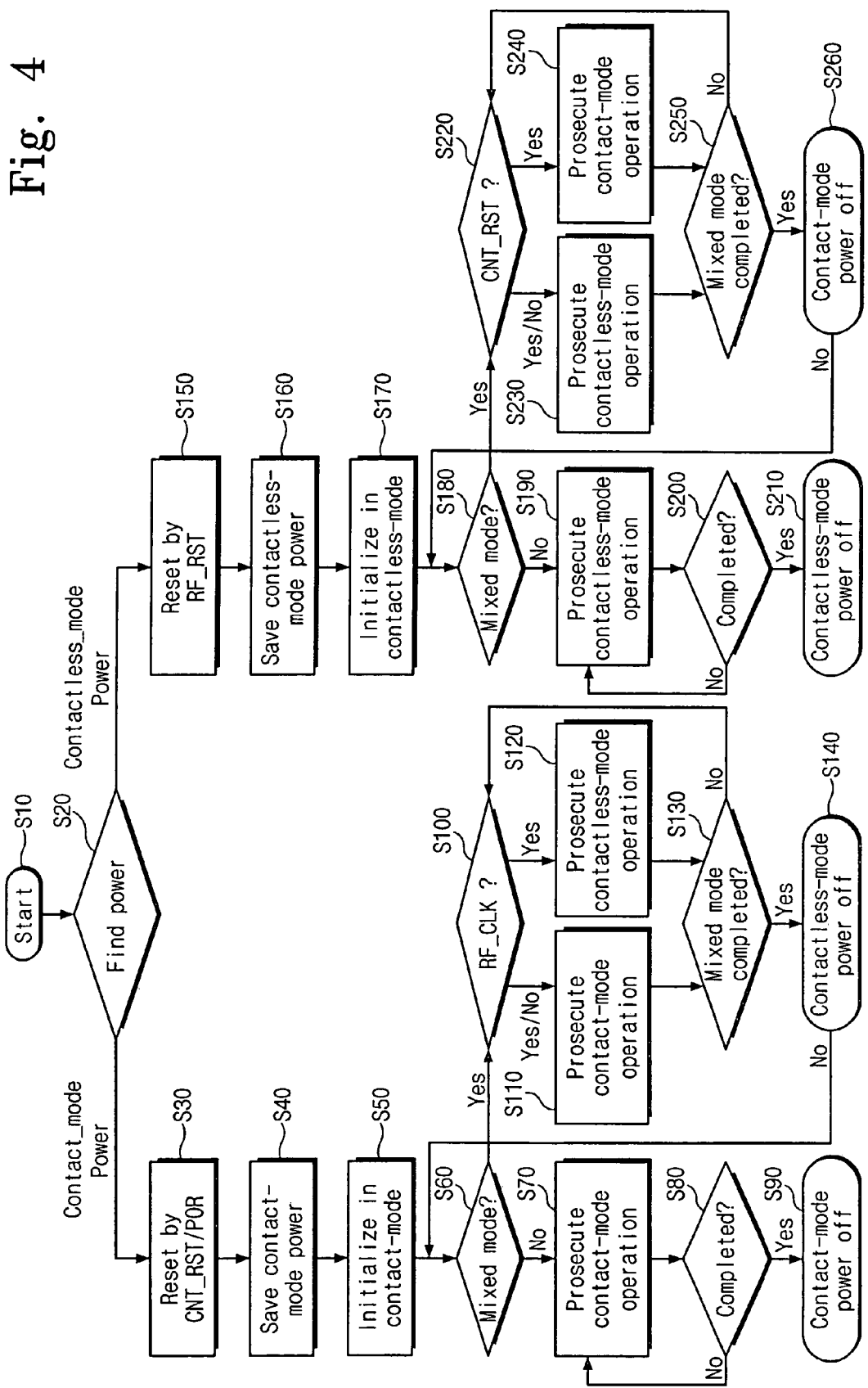
FIG. 4 is a flow chart showing one exemplary method of controlling a mixed mode smart card in accordance with another embodiment of the invention.

FIG. 4 is a flow chart showing one exemplary method for controlling a mixed mode smart card according to an embodiment of the invention. Exemplary method steps will be indicated by the nomenclature (SXXX).

Referring to FIG. 4, the contact mode power source voltage (CNT_VDD) or the contactless mode power source voltage (RF_VDD) is identified in the mixed mode smart card as a first applied voltage through either a contact mode interface terminal or a contactless mode interface terminal (S10). The first applied voltage is then applied to the mixed mode smart card (S20).

From this determination, if the first applied voltage is the contact mode power source voltage (CNT_VDD), it is saved as the first power signal (CON) (S40) in response to a received contact mode reset signal (CNT_RST) or a power-on reset signal (POR) (S30). With the first power signal (CON), internal circuit 220 is initialized in contact mode (S50).

Once operating in contact mode, the mixed mode smart card continually determines whether mixed mode operation is required (S60). If not, internal circuit 220 prosecutes contact operation mode (S70), until completed (S80) and powered off (S90) using contact mode power source voltage (CNT_VDD) as the first (and only) power voltage (CON).

If, however, the mixed mode smart card receive some indication of a mixed mode operation after initializing in contact mode, a determination is made as to whether the contactless mode clock (RF_CLK) is actually apparent (i.e., present for some minimum number of clock cycles) (S100). If the contactless mode clock is (RF_CLK) apparent, internal circuit 220 performs an input/output operation in contactless mode (S120). However, the ongoing contact mode operation continues regardless of the appearance of the contactless mode clock (RF_CLK) (S110). Mix mode operation continues under these conditions (S130), until the contactless mode clock (RF_CLK) is no longer apparent or the contactless mode of operation is powered off (S140).

Thus, so long as the contactless mode power source voltage (RF_VDD) is applied to internal circuit 220 in a mixed mode operation, internal circuit 220 need not be initialized because the first power voltage (CON) remains the contact mode power source voltage (CNT_VDD) first applied. Thus, the ongoing contact mode operation may be continued, yet the interrupting contactless ode operation prosecuted using a stable power voltage.

On the other hand, where the first applied voltage is the contactless mode power source voltage (RF_VDD) (S20), it is saved as the first power voltage (CON) in response to the contactless mode reset signal (RF_RST) (S150 and S160). Then, with the first power signal (CON), internal circuit 220 is initialized in the contactless mode.(S170). Then, it is determined whether or not a mixed mode of operation is indicated (S180). Upon determining that mixed mode is not indicated, internal circuit 220 prosecutes the contactless mode operation (S190), until completed (S200) and powered-off (S210) as enabled by the contactless mode power source voltage (RF_VDD) stored as the first power voltage (CON)

However, if a mixed mode of operation is indicated, the mixed mode smart card 210 determines if the contact mode reset signal (CNT_RST) is present (S220). If the contact-mode reset signal (CNT_RST) is present, internal circuit 220 performs an input/output operation for the contact mode (S240). However, the contactless mode operation continues to be prosecuted regardless of the presence of the contact-mode reset signal (CNT_RST) (S230). Thereafter, it determines whether the mixed mode is terminated (S250). If the mixed mode is terminated, the contact mode power source voltage (CNT_VDD) is interrupted (S260), Also in this case, while the contact mode power source voltage (CNT_VDD) is applied to internal circuit 220 in a mixed mode of operation, internal circuit 220 need not be initialized because the first power voltage (CON) remains the contactless mode power source voltage (RF_VDD). Thus, mixed mode operation of the smart card may be stably continued, assuring faithful prosecution of both contact and contactless mode of operation.

Although the invention has been described in connection with several embodiments of the invention illustrated in the accompanying drawings, it is not limited to only these embodiments. It will be apparent to those skilled in the art that various substitution, modifications and changes may be thereto without departing from the scope of the invention, as defined by the following claims.

What is claimed is:

1. A mixed mode smart card comprising:
   an internal circuit;
   a contact mode interface adapted to supply a first power source voltage received through a power source terminal;
   a contactless mode interface adapted to supply a second power source voltage through an antenna;
   a power voltage control block adapted to supply an internal power source voltage to the internal circuit derived from a first applied voltage between the first and second power source voltages; and
   an interface block adapted to generate a system clock from a contact mode clock supplied through a contact mode clock terminal when the first applied voltage is the first power source voltage, and from a contactless mode clock abstracted from the second power source voltage when the first applied voltage is the second power source voltage.

2. The smart card of claim 1, wherein the contact mode interface comprises an ISO 7816 compatible interface, and the contactless mode interface comprises an ISO 14443 compatible interface.

3. The smart card of claim 1, wherein the power voltage control block is further adapted to abstract a contactless mode clock, a contactless mode reset signal, and contactless data from the second power source voltage.

4. The smart card of claim 1, wherein the interface block is further adapted to generate a system reset signal from a contact mode reset signal supplied through a contact mode reset terminal when the first applied voltage is the first power source voltage,
   and from a contactless mode reset signal abstracted from the second power source voltage when the first applied voltage is the second power source voltage.

5. The smart card of claim 4, wherein the power voltage control block comprises:
   a power voltage detector adapted to identify a first applied voltage between the first and second power source voltages; and
   an RF data abstractor adapted to obtain the contactless mode clock, the contactless mode reset signal, contactless mode data, and the internal power voltage from the second power source voltage.

6. The smart card as set forth in claim 5, wherein the power voltage control block further comprises:
   a power mode storage block storing the first applied voltage as a first power signal in response to either the contactless mode reset signal or a contact mode reset signal applied through a contact mode reset terminal.

7. The smart card of claim 6, wherein the power voltage control block further comprises:
   a first switch regulating connection of the contactless mode internal power voltage to the internal circuit in response to a mixed-mode entering signal; and
   a second switch regulating connection of the first power source voltage to the internal circuit in response to the first power signal.

8. The smart card of claim 1, wherein the internal circuit comprises:
a central processing unit (CPU);
a contact mode processor adapted to prosecute a contact mode operation in conjunction with the CPU and in response to the system clock and received contact mode data; and
a contactless mode processor adapted prosecute a contactless mode operation in conjunction with the CPU and in response to the system clock and received contactless mode data.

9. The smart card of claim 8, further comprising:
a mixed mode control block adapted to generate a mode conversion signal in response to the contactless mode clock received during the contact mode operation, or a contact mode reset signal received during the contactless mode operation.

10. The smart card of claim 9, wherein the mixed-mode control block generates a first mode conversion signal in response to the contactless mode clock and a second mode conversion signal in response to the contact mode reset signal.

11. The smart card of claim 10, wherein the CPU initiates operation of the contactless mode processor in response to the first mode conversion signal, and initiates operation of the contact mode processor in response to the second mode conversion signal.

12. The smart card of claim 11, wherein the contact mode processor is operable during a contactless mode operation enabled by the second power source voltage, and wherein the contactless mode processor is operable during a contact mode operation enabled by the first power source voltage.

13. The smart card of claim 9, further comprising:
a mixed mode error detection block generating a mixed mode error signal in response to any one of the contactless mode clocks, the contact mode reset signal, the system clock, and the mode conversion signal.

14. The smart card of claim 13, wherein the CPU interrupts operation of the contact mode processor or the contactless mode processor in response to the mixed mode error signal.

15. A method for controlling a smart card adapted for use in mixed modes, the method comprising:
receiving in the alternative a contact mode power source voltage or a contactless mode power source voltage as a first applied voltage;
upon receiving the contact mode power source as the first applied voltage, prosecuting a contactless mode operation during a contact mode of operation while maintaining the contact mode power source as the power source for the smart card; and,
upon receiving the contactless mode power source as the first applied voltage, prosecuting a contact mode operation during a contactless mode of operation while maintaining the contactless mode power source as the power source for the smart card.

16. The method of claim 15, further comprising:
generating an internal power source voltage from the first applied voltage and applying the internal power source voltage to an internal circuit comprising a central processing unit, a contactless mode processor, and a contact mode processor.

17. The method of claim 16, further comprising:
initiating a mixed mode of operation upon receiving a contactless mode clock when the first applied voltage is the contact mode power source voltage, or upon receiving a contact mode reset signal when the first applied voltage is the contactless mode power source voltage.

18. The method of claim 17, wherein the internal power source voltage is maintained without change during the mixed mode of operation.

19. A mixed mode smart card comprising:
an internal circuit comprising a central processing unit, a contactless mode processor adapted to prosecute a contactless mode operation, and a contact mode processor adapted to prosecute a contact mode operation; and,
a power, voltage control block adapted to receive a contact mode power source voltage and a contactless mode power source voltage, and further adapted to supply the internal circuit with an internal power source voltage derived from a first applied one of the contact mode power source voltages and the contactless mode power source voltage during an entire period of mixed mode operation characterized by either a contactless mode operation initiated during a contact mode operation following receipt of the contact mode power source voltage as the first applied one, or a contact mode operation initiated during a contactless mode operation following receipt of the contactless mode power source voltage as the first applied one.

20. The smart card of claim 19, wherein the power voltage control block comprises:
an ISO 7816 compatible contact interface adapted to receive the contact mode power source voltage; and,
an ISO 14443 compatible contactless interface adapted to receive the contactless mode power source voltage.

* * * * *